United States Patent [19]

Danner

[11] Patent Number: 4,860,342
[45] Date of Patent: Aug. 22, 1989

[54] COMPUTER-TELEPHONE INTERFACE METHOD AND APPARATUS

[76] Inventor: David L. Danner, 1806 T St., N.W., Washington, D.C. 20009

[21] Appl. No.: 36,333

[22] Filed: Apr. 9, 1987

[51] Int. Cl.$^4$ .................. H04M 11/00; H04M 1/56
[52] U.S. Cl. ........................................ 379/96; 379/354
[58] Field of Search .................. 379/96, 97, 98, 354

[56] References Cited

U.S. PATENT DOCUMENTS

| | | | |
|---|---|---|---|
| 4,291,198 | 9/1981 | Anderson et al. | 379/354 X |
| 4,431,870 | 2/1984 | May et al. | 379/354 X |
| 4,524,244 | 6/1985 | Faggin et al. | 379/96 X |
| 4,640,989 | 2/1987 | Riner et al. | 379/96 |
| 4,660,218 | 4/1987 | Hashimoto . | |

OTHER PUBLICATIONS

Baizcomp, Sunnyvale, Calif. Brochure Entitled "There's Only One PC/XT Modem Designed To Let Both You and Your Computer Talk,", received 3/11/85.
*Telecommunications*, "Professional Workstation: Products Feature Zaisan, Inc. Houston Texas," p. 114, of Sep. 1984 issue.

*Primary Examiner*—Keith E. George
*Attorney, Agent, or Firm*—Rogers & Killeen

[57] ABSTRACT

A method and apparatus for a computer-telephone interface system by which a general purpose personal computer is enabled to perform telephone functions such as dialing, answering ringing lines, and placing lines on hold without the need for a separate telephone instrument. The interface system is responsive to digital signals received from a microprocessor in the computer to implement the signalling functions utilized in a standard switched telephone network. The interface system performs dialing sequences entered either from the keyboard of the computer, a location in the computer memory, a location on a display screen associated with the computer or a location specified by a cursor used in association with the keyboard. Operation of the interface system does not interfere with the concurrent operation by the computer of an applications program.

21 Claims, 4 Drawing Sheets

COMPUTER-TELEPHONE INTERFACE METHOD AND APPARATUS

BACKGROUND OF THE INVENTION

The present invention relates to input and output devices for computer systems. More particularly, the subject invention relates to an interface method and apparatus which enable a general purpose personal computer to control and/or perform certain of the switching and signalling functions of a telephone.

With the miniaturization of computer circuitry and the associated reduction in the cost of computing apparatus, small digital computer systems, often called personal computers, are increasingly being utilized in business offices and residential homes. Such personal computers are used within an office for a wide variety of tasks or applications including word processing, records storage, order entry, calendar reminder systems, bookkeeping, generation of standardized letters/forms, and storage/retrieval of information from data bases. Because such personal computers are usually general purpose devices, i.e., they are not programmed for the performance of a single, specific application, many offices operate plural applications on the same computer. Thus, it is not at all uncommon for business persons to spend a large percentage of working hours operating a personal computer in one or more of the above mentioned or other applications.

Most personal computers are operated through the manipulation of a standard typewriter keyboard which electrically communicates with a general purpose computer program, usually called an operating system program, of the personal computer to read, store, or manipulate files of data within the computer to the end desired by the computer user. As such, the operation of a personal computer is usually performed most efficiently by the use of both hands of the user in standard typewriting fashion.

Other input devices, such as mouses and light pens, which may be efficiently operated by one hand have come to be utilized for some applications. However, in certain contexts, such as the entry of textual data, such input devices are often less efficient than a typewriter keyboard.

Many persons who utilize a personal computer in their activities frequently require the use of a telephone while using the computer. Persons such as telephone order takers, "hot line" operators, office clerical personnel, and the like exemplify such persons. As a conventional telephone instrument, comprising a base and handset generally requires the use of one hand to hold the handset in place against the head of the user, it becomes awkward to operate the computer keyboard and hold a telephone handset simultaneously.

To reduce the difficulty of simultaneously operating a keyboard and holding a telephone handset, it is known to replace the handset with a headset comprising an earpiece, microphone, and headband to affix the earpiece and microphone adjacent the appropriate locations on the user's head. Such an arrangement frees the user from having constantly to hold a handset and thus enables ready use of the computer keyboard. Even with such use of headsets, however, some clumsiness is entailed as a switch must be located near the user to take the place of the telephone's hook switch within the cradle of a telephone receiver. As there is no longer a handset to be placed in the cradle to operate the hook switch, a manual switch has usually been substituted.

If the user of a headset desires to place calls, and not merely answer them, a conventional telephone instrument has generally been required in addition to the computer. The telephone instrument is utilized, primarily, for operation of its keypad which sends dialing signals on the telephone line to instruct the telephone system what other telephone is to be joined in a desired communication. As a typical personal computer and keyboard consume a considerable amount of room on a typical work desk, a telephone instrument needed for dialing functions must often be placed out of reach of the person sitting at the computer keyboard, again making for a clumsy arrangement wherein the user must move away from his/her work station, the computer keyboard, in order to dial the telephone.

In an attempt to increase the efficiency of a user of a telephone, it is known to design "smart" telephones in which microprocessors are included within the telephone circuitry to implement various desired functions. For example, in the telephone described in the Anderson, et al., U.S. Pat. No. 4,291,198 a telephone unit includes a handset, video display screen, keyboard, and microcomputer which provides "the power of computer based services" to the telephone user. The microcomputer in the Anderson, et al., patent is dedicated to the telephonic functions. In the Hoff, et al., U.S. Pat. No. 3,932,709, electronic circuitry is embedded within the telephone housing to store and display telephone numbers and perform local arithmetic computations. The circuitry within the telephone of Hoff, et al., can also memorize numbers for subsequent redialing upon demand. Again, the circuitry of the Hoff, et al., device is dedicated to the telephonic functions.

In the Squicciarini, U.S. Pat. No. 4,535,198, a digital terminal keyboard may be used to send digital signals to a system processor for call origination. The system processor of the telephone switching system treats the digital signals as a series of control messages for dialing a telephone line.

The May, et al., U.S. Pat. No. 4,431,870 describes a computer input/output device which is disclosed as performing the functions of a telephone. The device includes a video display terminal connected to a central processor which controls the video display and is capable of generating output tones corresponding to telephone keys.

In the Kessler, U.S. Pat. No. 4,503,288 a great variety of controllers and communications devices are connected to a microprocessor by way of a data bus. The unit operates to perform a variety of specific functions; however, it is not disclosed as being capable of running a wide variety of programs, i.e., it is not a general purpose computer.

Telephone signalling is often accomplished through the transmission of a predetermined set of frequency tones. Each of the tones selected represents one of the twelve dialing digits of a telephone, i.e., 0, 1, 2, ... 9, *, #. Within the United States and many other countries, a standard set of tones is utilized in which each "tone" is comprised of two tones being sounded simultaneously, called Dual Tone Multi Frequency (or "DTMF") signals. Because many telephones are equipped to send DTMF signals, such signals are becoming more widely used to transmit data or commands to other equipment once a telephone connection has been established. For example, such signals are known to be used for inquiring of computers as to bank balances or stock prices and for authorizing payment of bills. It is desirable to utilize DTMF signals in an integrated computer/telephone interface device to receive and store data, particularly telephone numbers to be dialed subsequently. With such a device a salesman in the field could schedule follow-up telephone calls to customers by calling into the device, signalling the telephone number of the customer. By appropriate coding, the device can store the telephone number and automatically dial the number at an appropriate time.

It is accordingly an object of the present invention to provide a computer input/output device which smoothly integrates the functions of a general purpose computer and a telephone into a single unit.

It is a further object of the present invention to provide a novel computer input/output device which eliminates the need for a telephone instrument for a person working at a computer work station.

It is still a further object of the present invention to provide a novel computer input/output device which can readily place telephone calls based on information which is displayed at any location within a typical computer display screen.

It is yet another object of the present invention to provide a computer input/output device in which telephone calls may be placed to the device, and data entered into the device by way of common telephone signals, and the entered data to be used to control telephone dialing functions.

It is still another object of the present invention to provide a novel computer input/output device which integrates the functions of a telephone and a computer so that the telephone functions can be controlled by the computer while the computer is being used as a general purpose personal computer.

These and other objects of the present invention will become apparent from the following detailed description taken in conjunction with the drawings in which:

DETAILED DESCRIPTION OF THE PREFERRED EMBODIMENT

Figure 1:
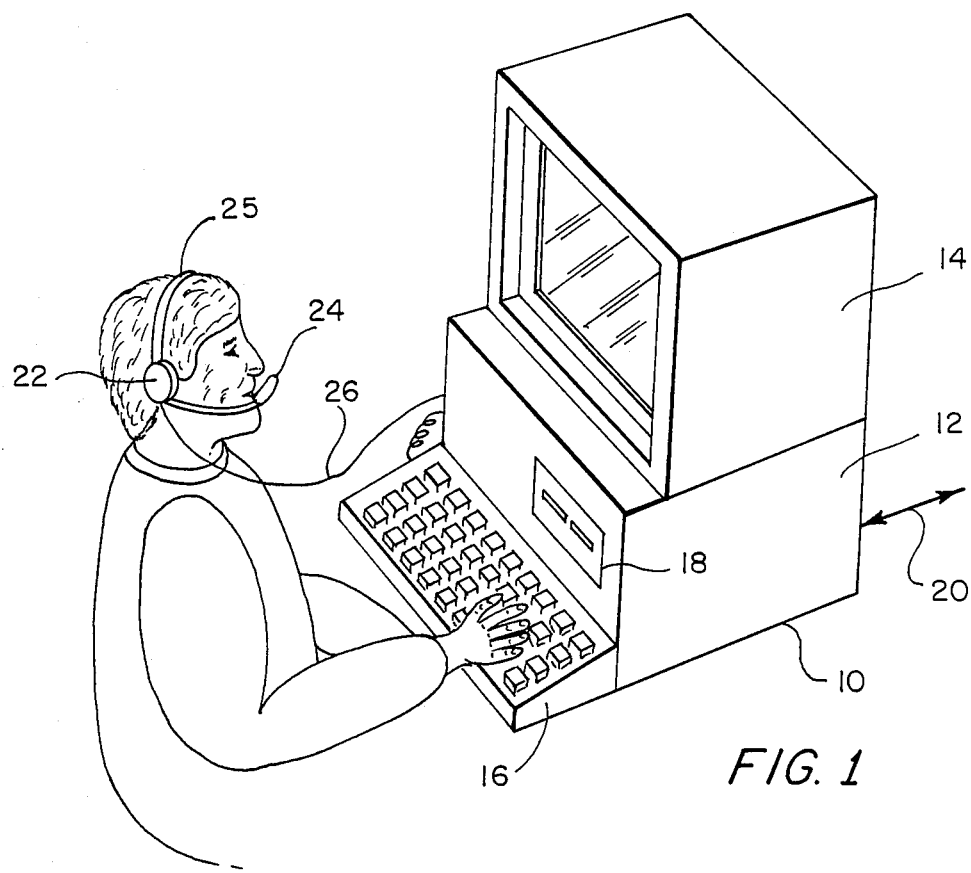
FIG. 1 is a pictorial representations of a person using the computer input/output device of the subject invention.

With reference to FIG. 1, a computer input/output device in accordance with the present invention may be installed in a personal computer work station 10. The work station 10 includes a housing 12, display monitor 14, and a keyboard 16. Within the housing 12 is contained a general purpose, microprocessor-driven computer, commonly called a personal computer, comprising a microprocessor, memory circuits, arithmetic logic units, and input/output control units which together form a general purpose computer. The housing 12 also contains a disk drive unit 18 which contains one or more disk drives. A telephone line 20 from a standard switched network, such as a public network or a private exchange communicates with the work station 10 by means of a telephone interface circuit (not shown). A conventional telephone headset, comprising an earpiece 22 a microphone 24 and headband 25 are used by the user of the work station 10 and are electrically connected within the housing 12 to the computer input/output device.

In operation, the microprocessor within the housing 12 reads and executes a program or programs available either in the internal memory or provided from a disk in one of the disk drive units 18. As is well known, the computer may receive instructions by way of the keyboard 16 and displays its results by way of the display monitor 14. Optionally, results may be displayed from the computer by printing on a printer (not shown) or other standard hard copy output device.

Conventionally, when a user wishes to execute a particular program in the computer, the user types a predetermined set of instructions or commands on the keyboard 16 which are interpreted by the computer as commands to execute the desired program. In a conventional fashion, the computer executes the series of instructions which form the program being executed. Additional details regarding which portions of the desired programs are to be executed or what data is to be utilized may be provided from the keyboard 16 or from the disk drive units 18 or from a internal disk drive unit, often called a hard disk (not shown).

When the user desires to use a telephone, e.g., to initiate a telephone call or to answer an incoming call, the user may depress a predetermined key or keys on the keyboard 16 which is interpreted by the computer as a request to utilize the telephone. The interface circuitry within the housing 12 performs the appropriate repertoire to establish the telephone call by activating the telephone line 20 and by connecting the telephone line 20 to the earpiece 22 and the microphone 24 by way of an audio line 26. After the telephone function has been initiated, inputs received from the keyboard 16 may be interpreted as dialing commands, hold command, or other telephonically related commands rather than inputs or instructions to the computer program which was previously running.

In the present invention, the signals needed to execute the telephone interface control repertoire are stored in portions of memory which are not utilized by the normal application programs operating on the computer. Consequently, when the user has completed entering his commands to the telephone portion of the computer, control is returned to the application program which was previously executing.

For most application programs, the application program will never realize that control has been wrested from it and processing of the application program will continue as if never interrupted. Meanwhile, the telephone conversation can continue, telephone line linkage having been established.

When a user desires to terminate or change the established telephone connection, the user may again invoke the telephone function by entering the appropriate unique code on the keyboard 16, whereupon the telephone function software resumes control of the computer while the change in telephonic function is implemented. This process of processing an application program and interrupting the application program to change telephone functions can continue indefinitely.

While the user is shown as using an earpiece 22 and microphone 24, any suitable telephone receiving device may be used such as a conventional telephone handset or a speaker phone. Use of a speaker phone avoids the need for a hand to hold a handset adjacent the head of the user; however, the use of plural speaker phones is generally not desirable if the plural users must be located near to each other.

Figure 2:
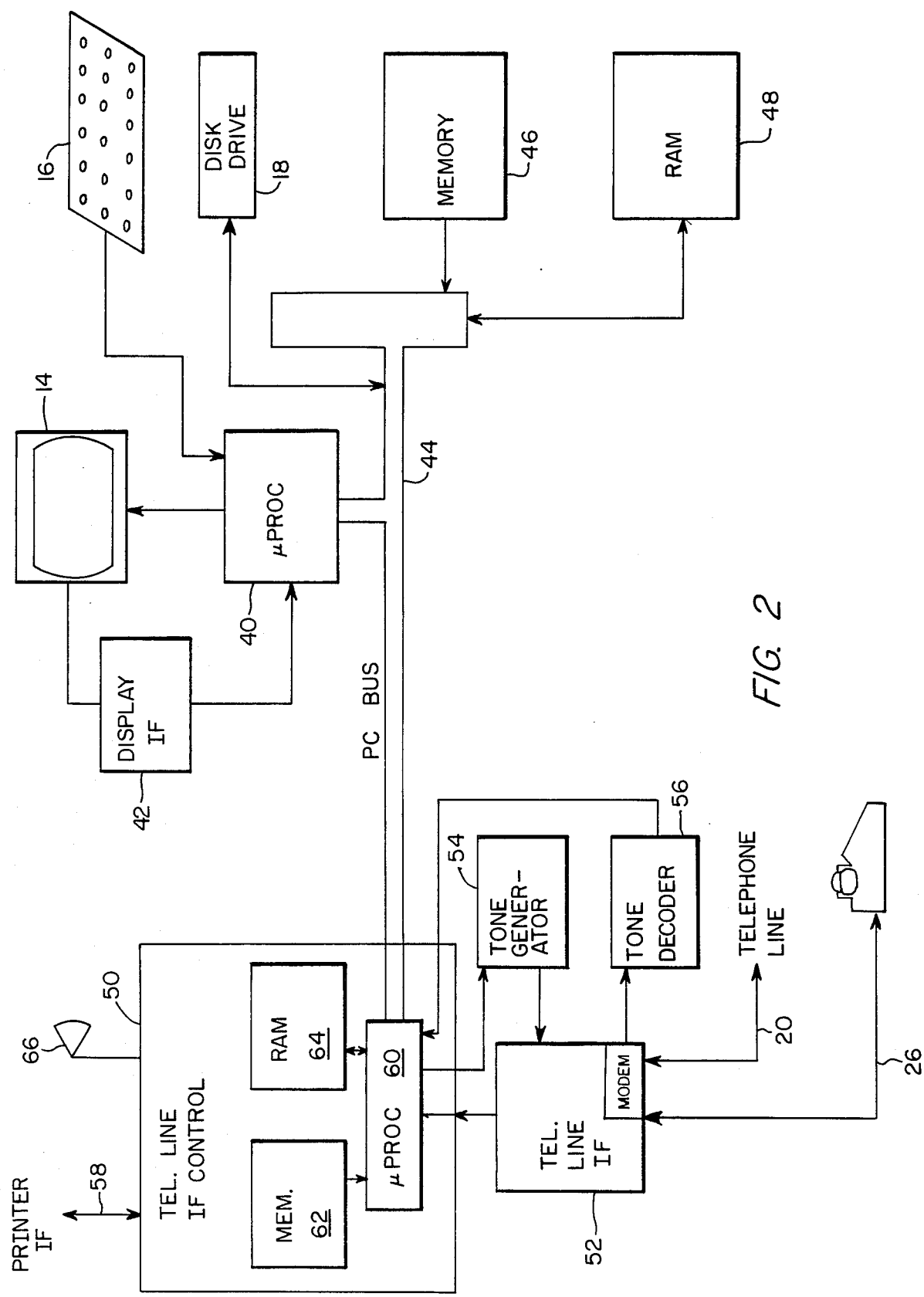
FIG. 2 is an overall block diagram of the computer input/output device of the present invention.

With reference to FIG. 2, wherein like elements have been provided with like numerals as used in FIG. 1, a communications system of the present invention includes a microprocessor 40 which communicates with a keyboard 16 and conventional disk drive unit 18. The microprocessor may generate and transmit signals to control a display monitor 14 and a display interface 42 may communicate the status of the display monitor 14 to the microprocessor 40.

As is well known in personal computers, the microprocessor 40 may communicate by way of a personal computer bus ("PC bus") 44 with a number of other devices, such as a memory unit 46 and a random access memory ("RAM") 48. The microprocessor 40 may also communicate via the PC bus 44 with a telephone line interface control unit 50, which communicates with a telephone line interface 52, a tone generator 54 and a tone decoder 56.

Figure 3:
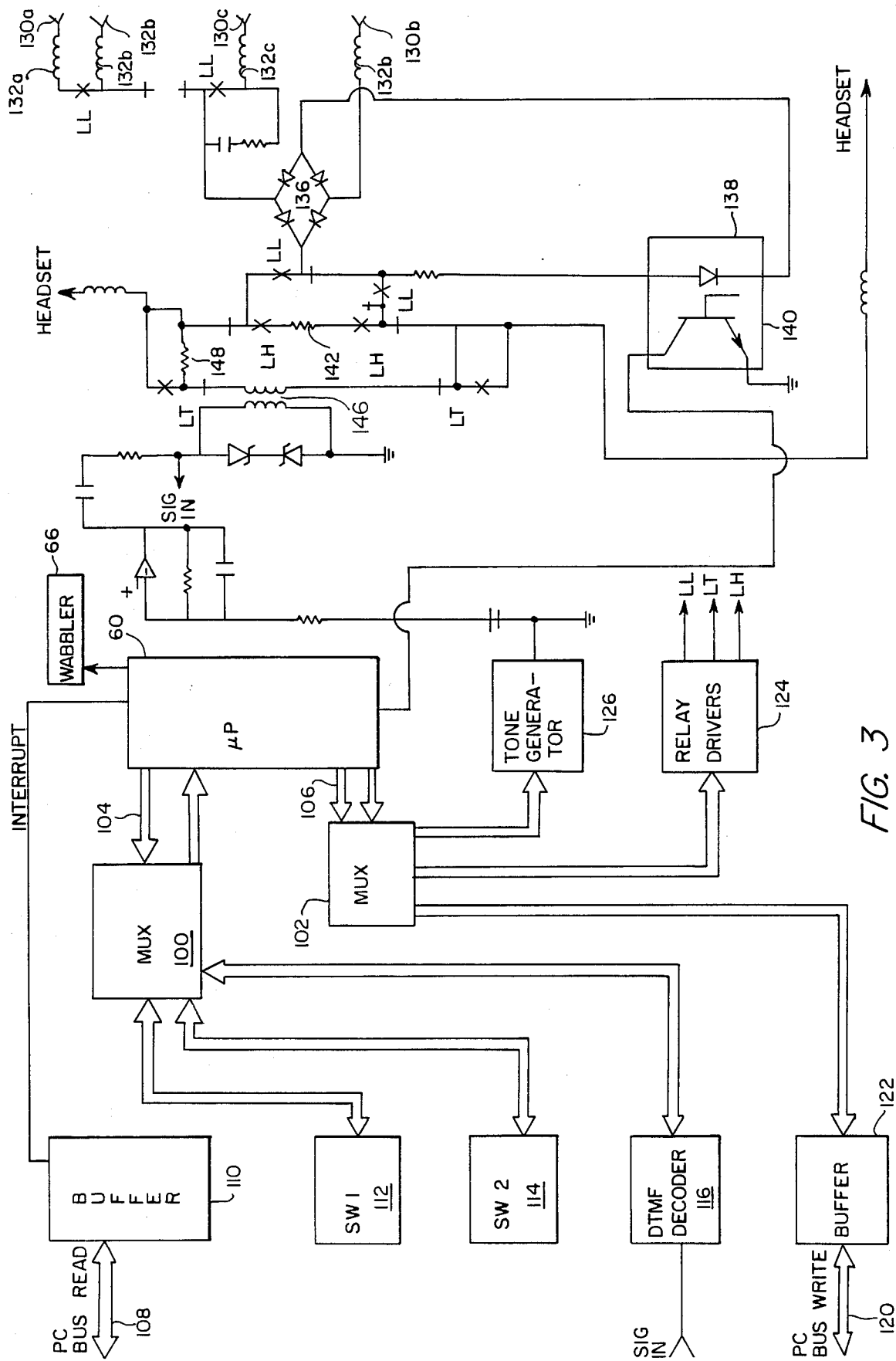
FIG. 3 is a block diagram of the telephone line interface control circuit of the computer input/output device of FIG. 2.

As is explained in more detail in association with FIG. 3, the telephone interface 52 may provide the electrical interface to connect a telephone line from a central office 20 to an audio line 26 utilized by the user of the communications system. The telephone line interface control circuit 50 may also provide an interface circuit between the PC bus 44 and a printer or other hard copy output device (not shown) through a printer interface circuit 58.

The telephone line interface control unit 50 includes a microprocessor 60, a memory unit 62, and elements of random access memory "RAM") 64. The telephone line interface control unit 50 may also control a bell or warble 66 which, as explained in more detail below, informs the user of the presence of an incoming telephone call.

In operation, when power is supplied to the microprocessor 40, it is programmed to read a computer program from either the memory 46 from the disk drive 18. The program, typically called an operating system, contains instructions for operation of the microprocessor and for controlling the various units such as the display 14, or disk drive unit 18, and for interpreting commands received from the keyboard 16 or other input device.

The operating system instructions can optionally be already existing in a dedicated microprocessor memory or may be received from an internal hard disk unit (not shown) which has previously been provided with the appropriate instructions. In a system in accordance with the present invention, a portion of the instructions loaded as part of the operating system or loaded immediately thereafter are instructions which inform the microprocessor of the manner in which to interpret the various keyboard entrys used to control the telephonic function of the communications system.

Once the microprocessor 40 has been programmed for general operation, it may be subsequently programmed to execute a particular applications program, input from either the memory 46, a floppy disk in the disk drive unit 18 or from any other conventional storage device. The applications program may be any suitable program to perform the functions desired by the users such as an accounting program, a word processing program, a spread sheet program, and/or a data base storage/retrieval system.

The application program can execute normally, prompting the user for data or requests and processing the data or requests as it has been programmed. When the user desires to place or answer a phone call, the user keys on the keyboard 16 the unique keystrokes designed to implement the telephone function. Upon receipt of the keystrokes from the keyboard 16, the microprocessor 40 momentarily interrupts the processing of the application program currently being executed and momentarily follows the instructions provided in the telephonic control section of the microprocessor's memory 46 or RAM unit 48. Once the telephonic function has been implemented, certain of the keys on the keyboard 16 may change in meaning to the microprocessor 40. For example, the "D" key may be interpreted as a demand to dial a sequence of numbers rather than to display the letter D on the display unit 14 as would be the normal operation for the applications program. Alternatively, the functions keys on the keyboard 16 may be utilized to provide commands to the microprocessor which are interpreted in a particular way when the telephone function has been implemented.

Depending upon exactly which function or control key has been depressed, the microprocessor sends responsive signals to the telephone line interface control unit 50 via the PC bus 44, instructing the control unit 50 to take the action requested by the telephone user. Immediately upon sending such a command, the microprocessor 40 may return to the normal processing of the applications program, which will usually continue to execute as if no interruption had been made.

Upon application of power to the microprocessor the microprocessor 60 of the control unit 50 executes a program which has been stored in its memory 62. The microprocessor uses the RAM unit 64 for temporary storage of data as required. When the microprocessor 60 at the control unit 50 interprets a command on the PC bus 44 which is intended for the control unit 50, the microprocessor 60 latches the command into the control unit 50 for response. A variety of commands may be transmitted to the control unit 50, including:

Answer the phone;
Dial one number;
Hook switch flash;
Place line on hold;
Dial last number;
Reset firmware;
Query current option settings;
Check line status;
Request number of DTMF tones;
Reset DTMF decoder to zero;
Ask for specified DTMF tone;
Request hardware version number;
Disconnect line;
Sieze another line; and
Change current option settings.

The meaning of each of these signals and the action taken by the control unit 50 is indicated below:

Answer The Phone. The telephone line is placed in an off hook condition and the warbler 66 is silenced (if operating).

Dial One Number. A number specified within the command is dialed by either connecting the tone generator to the telephone line 20 and turning on the tone generator 54 to the appropriate tone or by pulsing the telephone line in a conventional pulse dialing operation.

Hook Switch Flash. The telephone line is momentarily opened. The open signal is interpreted by standard telephone equipment connected to the telephone line 20 as a request to perform specific actions.

Place Line On Hold. The telephone line 20 is disconnected from the audio path 26 but the line remains loaded so that a connection remains extent.

Dial Last Number. The last full telephone number which was dialed by the control unit 50 is dialed again as a series of single digit dialing.

Place in Monitor Mode. In the monitor mode, the signals received on the telephone line 20 are sent to the tone decoder 56 which interprets whether one of the standard DTMF tones is being received and notifies the control unit 50 of the receipt of the tone for storage in the RAM 64.

Query Current Option Settings. The control 50 unit may be equipped with one or more manual switches to enable the user of a unit to customize various features of the control unit 50 to the telephone system to which the unit is installed. For example, the length of time that a tone is placed on the telephone line 20, the length of time that the line is opened for a hook switch flash, the length of time that the warbler 66 waits before a ringing sequence and others may be selected by the user through the switch settings. By interrogating the control unit 50, the microprocessor 40 can be made aware of the status of the switch settings to determine desired program operation of the program resident in the RAM unit 48.

Reset Firmware. If the program in the microprocessor 40 suspects that the program in the microprocessor 60 in the control unit 50 is not operating correctly, the microprocessor 40 may send a signal to the control unit 50 to command the microprocessor 62 reset the control unit 50 both electrically and logically.

Check Line Status. By use of this command the microprocessor 40 requests the control unit 50 to return a signal indicating the status of the telephone line 20, whether or not the line is on hook, off hook, ringing, on hold, etc.

Request Number of DTMF Tones. By use of this command the microprocessor 40 can request that the control unit 50 return a signal indicating the number of DTMF tones which have been received, decoded and stored in the control unit RAM 64.

Reset DTMF Decoder to Zero. This command instructs the microprocessor 60 to reset the count of the number of DTMF tones decoded by the DTMF decoder to zero, which, in effect, losses the previous tones which have been received.

Ask For Specified DTMF Tone. The microprocessor 40 can request that the control unit 50 return a signal indicating the identity of the tone which was in the specified position in the tone string.

Ask For Firmware Version. By this command the microprocessor 40 requests that the control unit 50 return a signal indicating which version of the control unit 50 has been installed in the computer.

Disconnect Line. This command instructs the control unit 50 to hang up the telephone line, i.e., place the line in the "on hook" condition.

Seize Another Line. This command instructs the control unit 50 to place the telephone line in the off hook condition, i.e., to load the line and to prepare for dialing.

The foregoing list of commands is illustrative and other commands could be utilized to implement various features without departing from the spirit of the invention.

With reference to FIG. 3, a circuit to implement the telephone line interface control unit 50 and the telephone line interface 52 may be driven by a microprocessor 60. The microprocessor 60 may communicate with a read multiplexor 100 and with a write multiplexor 102. A conventional microprocessor such as one which may be used as microprocessor 60 generally has a limited number of lines through which it can read or write information; however, many lines are needed for the various signals which are needed by or from the microprocessor 60. Consequently, the multiplexors 100, 102 are used to switch the read and write lines of the microprocessor 60 to various devices and signal lines as needed and at the control of the microprocessor 60. For example, the microprocessor 60 may use multiplexor control lines 104 or 106 to control the settings of the read multiplexor 100 and write multiplexor 102 respectively. The read multiplexor 100 may be electrically connected to the read portion of the PC bus 108 through a buffer 110 which latches onto data which is present on the read portion of the PC bus 108 and addressed to the control unit 50. The input to the read multiplexor 100 may also include first and second switch sets 112, 114 each of which may contain plural, independent manual switches, and to a DTMF decoder 116.

Similarly, the write multiplexor 102 may be electrically connected to the write portion of the PC bus 120 through a buffer 122 which latches data ready to be written onto the write portion of the PC bus 120 until the PC bus 44 has accepted the data. The write multiplexor 102 may also be electrically connected to a set of relay drivers 124 (which drive the line load ("LL"), line talk ("LT"), and line hold ("LH") relays and to a tone generator 126 which generates one of the standard DTMF tones upon receipt of a signal from the write multiplexor 102.

Each of the devices connected to the read multiplexor 100 and the write multiplexor 102 are connected via both data lines and control lines. The data lines transmit data to or from the multiplexors 100, 102 and the control lines specify which of the parallel devices operatively attached to the multiplexors 100, 102 are to be in operation at any one time.

A standard four wire telephone connection 130 A, B, C, and D, is provided to inductors 132 A, 132 B, 132 C, and 132 D respectively. The first two leads 130 A, 130 B, form the A, A1 signalling leads used in standard key telephone systems. The second set of leads 130 C, 130 D, form the standard tip and ring leads in a telephony circuit.

The first set of leads, 130 A, 130 B, are connected across the terminals of the line load relay LL. The tip 130 C is connected across the inductor 130 C to a terminal of the line load relay LL. When the line is loaded, the line load relay LL is closed and the signal appearing at the tip lead 130 C is provided to the diode bridge 136. The ring lead 130 D is provided through the inductor 132 D to the other side of the diode bridge 136. From one of the output terminals of the diode bridge 136 a ring detect lead 138 exits to an opticoupler 140 and the output of the opticoupler 140 is provided to the microprocessor 60. The signal appearing at another output of the diode bridge 136 is provided through the line load relay LL to the line hold relay LH across a resistor 142. From the line hold relay LH, the signal is provided to the terminals of a line talk relay LT to the secondary winding of a transformer 146. The terminal of the line hold relay LH is also connected through a resistor 148 to a headset or similar device 150.

The output signal from the tone generator 126 is amplified and provided to the primary winding of the transformer 146 through a suitable amplifying network.

In operation, data received on the PC bus may be read through the buffer 110 to the read multiplexor 100. The microprocessor 60 controls which input appears on the read multiplexor 100, i.e, whether the buffer 110, the first switch set 112, the second switch set 114, or the output of the DTMF decoder 116 is provided to the read ports of the microprocessor 60 through the read multiplexor 100. In a similar fashion, the write multiplexor 102 is controlled to determine which of the output devices, i.e., the tone generator 126, the relay drivers 124 or the write buffer 122 are connected to the write ports of the microprocessor 60 at any one time.

When data addressed to the interface unit 50 is received via the read portion of the PC bus 108 and the read buffer 110, a signal indicating the presence of data addressed to the microprocessor 60. When the microprocessor detects a signal on the interrupt line, the microprocessor 60 knows that data is ready to be read at the buffer 110. Typically the data to be read at the buffer 110 consists of commands from the microprocessor associated with the general purpose computer, or from some other device communicating on the PC bus 44. Additionally, the read buffer 110 many contain signals representing data to be supplied to the microprocessor 60, such as the subscriber number of the telephone to be dialed.

Upon receiving the commands and/or data, the microprocessor 60 takes the action appropriate to the command, resetting status flags within its own logic, controlling the various output devices and/or preparing data to be transmitted to the microprocessor 40 associated with the general purpose computer.

The first switch set 112 and the second switch set 114 each contain plural individual switches which may be set manually by the user of the system to indicate which of various options, such as the length of the tones which signal the telephone network, are to be utilized. As the switches are manual, even if power is lost to the microprocessor and its memories, upon restoration of power the switches may be read to inform the microprocessor 60 of the desired state of the variable settings. Other conventional semi-permanent indicators such as code plugs, broken wiring traces, etc., may be utilized in place of the switch sets 112 and 114.

The DTMF decoder 116 receives a signal SIG IN derived from the telephone line as sensed on the primary side of the transformer 146. The DTMF decoder 116 is a conventional decoder which examines the content of the SIG IN signal and provides a digital output indicative of whether one or more of the predetermined DTMF tones is present within the signal. The digital decoded signal is provided to the microprocessor 60 through the read multiplexor 100 when requested by the microprocessor 60.

The microprocessor 60 also controls the writing of data to the PC bus 44 through the write buffer 122 and write multiplexor 102. When desired, the microprocessor 60 may transmit the data to be written to the write multiplexor 102 and a signal which indicates that the data is to be written to the write buffer 122. The write multiplexor 102 in turn enables the write buffer 122 and provides the data to be written to the buffer 122. In a conventional fashion, the write buffer 122 writes the data on the write portion of the PC bus 120 at the appropriate time and providing the appropriate addressing signals as is well known and conventional in general purpose personal computers.

The microprocessor 60 may also control the tone generator 126 through the write multiplexor 102. The tone generator 126, upon receiving a digital signal indicative of a tone to be provided, generates the appropriate DTMF or dialing tones which are provided through the conventional amplifying network to the transformer 146 and ultimately to the telephone line itself.

The microprocessor 60 additionally controls the relay drivers 124 through the write multiplexor 102. When the state of any of the relays, LL, LT, or LH is desired to be changed, the microprocessor 60 can send signals indicative of the change of state of the relay drivers to the write multiplexor 102 which in turn enables the relay drivers 124 as specified by the microprocessor 60. The relay LL controls the loading of the telephone line, i.e., the on hook or off hook condition. The line talk relay LT controls the provision of the audio signal to the headset 150, independently of the condition of the line load relay LL. The line hold relay LH disables the audio signal from being transmitted to and from the telephone line while maintaining the line in a loaded condition.

Figure 4:
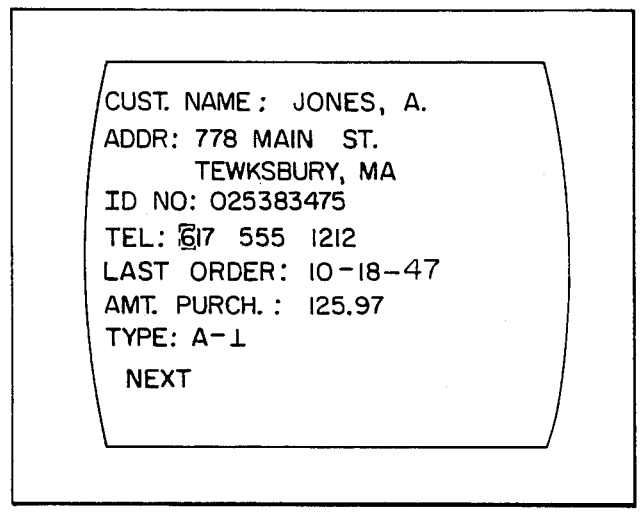
FIG. 4 is a pictorial representation of a sample display screen which can be utilized to control telephone dialing in the computer input/output device of FIG. 2.

With reference to FIG. 4, a display terminal 14 in a computer-system utilizing the present invention may be used to present information stored in a database within the computer system. For example, as depicted in the display terminal 14, the information may include the identification of customers. The information may be arranged in a wide variety of manners on the display terminal 14.

Many software programs exist to sort, store and display information. However, often each of the programs displays the information in different locations with the face of the display terminal. In accordance with the present invention, the user may provide signals indicating at what location on the face of the display terminal 14 is displayed a telephone number. Such signals may be supplied whenever the user desires the computer telephone interface unit to automatically dial the displayed number or they may be previously stored and utilized at the command of the user. In either event, the interface unit interprets the numbers at the specified location as being a telephone number and automatically places the desired call.

The system as described herein and the features discussed are intended only for purposes of illustration and discussion. It is of course contemplated that many of the features could be added and various changes and modifications in the system could be accomplished without departing from the spirit and scope of the invention.

What is claimed:

1. A communication system for coupling to a telephone line comprising:
   a microprocessor housing;
   a microprocessor located within said microprocessor housing;
   a keyboard having a plurality of alphanumeric data entry keys comprising a full alphanumeric key set in a non-orthogonal typewriter array in communication with said microprocessor;
   memory means located within said microprocessor housing and in communication with said microprocessor for controlling the operation of said microprocessor;

random access memory means located within said microprocessor housing and in communication with said microprocessor for temporary storage of data;

communication bus means in communication with said microprocessor for communicating data and instructions to a device remote from said microprocessor;

television display means, including plural display lines, in communication with said microprocessor for displaying selected visual data to a user of the system;

telephone line interface means located within said microprocessor housing for coupling to a telephone line, said telephone line interface means including means for receiving electrical signals from and providing electrical signals to a telephone line, including an off-hook signal to maintain a telephone line connection;

dialing means operatively connected to said telephone line interface means for selectively providing signals representing telephone dialing digits to said telephone interface means;

telephone line interface control means located within said microprocessor housing for controlling the operation of said telephone line interface means, said control means comprising:
  a control microprocessor in communication with said communication bus means;
  control memory means in communication with said control microprocessor for controlling the operation of said control microprocessor; and
  control random access memory means in communication with said control microprocessor for temporary storage of data;

a telephone instrument having a speaker for converting electrical signals received from said telephone line interface means to audio signals and having a microphone for converting audio signals to electrical signals to be provided to said telephone line interface means;

tone decoding means operatively connected to said telephone line interface means for decoding selective electrical signals received from said telephone line at said telephone interface means into a predetermined set of digital signals and having an associated memory means for saving a plurality of said digital signals; and display interface means for converting a selected portion of said display lines which can be anywhere on said display means into signals representing a telephone number to be dialed; whereby a user selects any section of the display means as said selected portion of said display lines, causes a desired telephone number to be displayed within said portion of said display lines and causes said system to place a telephone call to the desired telephone number.

2. The communication system according to claim 1 wherein said memory means and said random access memory means are concurrently shared by signals for operating said microprocessor as an element of the communication system and signals for operating said microprocessor in another function other than as an element of the communication system.

3. The communication system according to claim 1 wherein said television display means are used by said system only upon selected occurrences and wherein the status of said plural display lines prior to the use of said television display means by said system is restored by said system upon its cessation of use of said television display means.

4. The communication system according to claim 3 wherein the status of all of said plural display lines is updated upon each use of said keyboard.

5. The communication system according to claim 1 wherein said telephone line interface means further comprises:
  means operatively connected to the telephone line for detecting ringing signals on said telephone line and providing an indication thereof to said control microprocessor;
  means operatively connected to the telephone line and responsive to said control microprocessor for disconnecting said instrument from said telephone line while maintaining an off-hook status on said telephone line.

6. The communication system according to claim 5 wherein said telephone line interface means further comprises:
  means for generating a hook switch flash signal of variable duration on said telephone line means operatively connected to said dialing means for varying the duration of said signals representing telephone dialing digits; and,
  means for varying the sensitivity of said ringing signal detecting means.

7. The communication system according to claim 1 further comprising: modem means to convert digital electrical signals into pulse modulated electrical analog signals, said modem means operatively connected to said telephone line interface means whereby selected digital data may be sent via said modem means to a remote device communicating with said telephone line.

8. The communication system according to claim 2 wherein said keyboard is used to provide commands and data to both said communication system and to said microprocessor when operating said other function.

9. The communication system according to claim 8 wherein the operation of said data entry keys is communicated to said system prior to being communicated to said microprocessor operating in said other function.

10. The communication system according to claim 9 wherein the operation of predetermined sequence of said data entry keys is communicated to said system but not to said microprocessor operating in said other function.

11. The communication system according to claim 10 wherein said other function is permitted to execute on said microprocessor during periods of time in which said system is not utilizing said microprocessor.

12. A telephone communication system for integrating a telephone line, a microprocessor and a user comprising:
  a microprocessor housing;
  a microprocessor located within said microprocessor housing;
  an alphanumeric data entry keyboard in communication with said microprocessor;
  program memory means located within said microprocessor housing and in communication with said microprocessor for storing plural signals to control the operation of said microprocessor;

data memory means located within said microprocessor housing and in communication with said microprocessor for temporary storage of data;

communication bus means in communication with said microprocessor for transferring data and instructions from/to plural remote devices;

visual display means, including plural display lines, in communication with said microprocessor for displaying selected visual data;

telephone line interface means located within said microprocessor housing for coupling to a telephone line, said telephone line interface means including means for receiving electrical signals from and providing electrical signals to a telephone line, including an off-hook signal to maintain a telephone line connection;

dialing means operatively connected to said telephone line interface means for selectively providing electrical dialing signals to said telephone interface means; telephone line interface control means located within said microprocessor housing for controlling the operation of said telephone line interface means said control means comprising:

a control microprocessor in communication with said communication bus means;

control program memory means in communication with said control microprocessor and storing plural signals to control the operation of said control microprocessor; and control data memory means in communication with said control microprocessor for temporary storage of data;

a speaker for converting electrical signals received from said telephone line interface means to audio signals; and, a microphone for converting audio signals to electrical signals to be provided to said telephone line interface means;

tone decoding means operatively connected to said telephone line interface means for decoding electrical signals into a predetermined set of digital signal; and display interface means for converting a portion of said display lines which can be anywhere on said display means into signals representing a telephone number to be dialed; whereby a user selects any section of the display means as said selected portion of said display lines, causes a desired telephone number to be displayed within said portion of said display lines and causes said system to call the desired telephone number.

13. The telephone communication system according to claim 12 wherein said program memory means and said data memory means concurrently share signals for operating said microprocessor as an element of the communication system and signals for operating said microprocessor in another function other than as an element of the communication system.

14. The telephone communication system according to claim 12 wherein said visual display means are used by said system only upon selected occurrences and wherein the status of said plural display lines prior to the use of said visual display means by said system is restored by said system upon its cessation of use of said visual display means.

15. The telephone communication system according to claim 14 wherein the status of all of said plural display lines is updated upon each use of said keyboard.

16. The telephone communication system according to claim 15 wherein said telephone line interface means further comprises:

means operatively connected to the telephone line for detecting ringing signals on said telephone line and providing an indicated thereof to said control microprocessor;

means operatively connected to the telephone line and responsive to said control microprocessor for disconnecting said speaker and said microphone from said telephone line while maintaining an off-hook status on said telephone line.

17. The telephone communication system according to claim 16 wherein said telephone line interface means further comprises:

means for generating a hook switch flash signal of variable duration on said telephone line;

means operatively connected to said dialing means for varying the duration of said electrical signals representing telephone dialing tones; and, means for varying the sensitivity of said ringing signal detecting means.

18. The telephone communication system according to claim 17 further comprising:

modem means to convert digital electrical signals into pulse modulated electrical analog signals, said modem means operatively connected to said telephone line interface means whereby selected digital data may be sent via said modem means to a remote device communicating with said telephone line.

19. The telephone communication system according to claim 13 wherein said keyboard is used to provide commands and data to both said communication system and said microprocessor operating in said other function.

20. The telephone communication system according to claim 19 wherein the operation of said data entry keys is communicated to said system prior to being communicated to said microprocessor operating in said other function.

21. The telephone communication system according to claim 20 wherein the operation of predetermined sequence of said data entry keys is communicated to said system but not to said microprocessor operating in said other function.

* * * * *